US010632418B2

(12) United States Patent
Blencoe et al.

(10) Patent No.: US 10,632,418 B2
(45) Date of Patent: *Apr. 28, 2020

(54) CARBONATION OF METAL SILICATES FOR LONG-TERM $CO_2$ SEQUESTRATION

(71) Applicants: UT-BATTELLE, LLC, Oak Ridge, TN (US); UNIVERSITY OF TENNESSEE RESEARCH FOUNDATION, Knoxville, TN (US); VIRGINIA MUSEUM OF NATURAL HISTORY FOUNDATION, Martinsville, VA (US)

(72) Inventors: James G. Blencoe, Harriman, TN (US); Donald A. Palmer, Oliver Springs, TN (US); Lawrence M. Anovitz, Knoxville, TN (US); James S. Beard, Martinsville, VA (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 15 days.

This patent is subject to a terminal disclaimer.

(21) Appl. No.: 15/635,950

(22) Filed: Jun. 28, 2017

(65) Prior Publication Data

US 2017/0291139 A1 Oct. 12, 2017

Related U.S. Application Data

(62) Division of application No. 14/168,272, filed on Jan. 30, 2014, now Pat. No. 9,718,693, which is a division of application No. 13/361,215, filed on Jan. 30, 2012, now Pat. No. 8,673,256, which is a division of application No. 12/016,098, filed on Jan. 17, 2008, now Pat. No. 8,114,374, which is a division of application No. 10/706,583, filed on Nov. 12, 2003, now abandoned.

(60) Provisional application No. 60/464,728, filed on Apr. 23, 2003.

(51) Int. Cl.
B01D 53/62 (2006.01)
C01F 5/24 (2006.01)
C01F 11/18 (2006.01)
C01B 32/60 (2017.01)

(52) U.S. Cl.
CPC .............. *B01D 53/62* (2013.01); *C01B 32/60* (2017.08); *C01F 5/24* (2013.01); *C01F 11/18* (2013.01); *C01F 11/181* (2013.01); *B01D 2251/30* (2013.01); *B01D 2251/604* (2013.01); *B01D 2258/02* (2013.01); *Y02C 10/04* (2013.01); *Y02P 20/152* (2015.11)

(58) Field of Classification Search
CPC ................................................... B01D 53/62
See application file for complete search history.

(56) References Cited

U.S. PATENT DOCUMENTS

| 1,494,029 | A |   | 5/1924  | Scofield et al. |
|-----------|---|---|---------|-----------------|
| 1,751,663 | A | * | 3/1930  | Scofield .................... C01D 7/00 423/190 |
| 2,209,753 | A |   | 7/1940  | Abrahams et al. |
| 2,630,371 | A |   | 3/1953  | Mower |
| 3,112,994 | A |   | 12/1963 | Donaldson |
| 3,699,206 | A |   | 10/1972 | Dunn, Jr. |
| 3,770,475 | A |   | 11/1973 | Wuhrer et al. |
| 3,882,221 | A | * | 5/1975  | Wilson ................. B01D 53/501 423/243.08 |
| 4,124,683 | A |   | 11/1978 | Lalancette |
| 4,478,796 | A |   | 10/1984 | Lalancette et al. |
| 5,811,070 | A |   | 9/1998  | You |
| 5,993,772 | A |   | 11/1999 | Ninane et al. |
| 6,066,516 | A |   | 2/2000  | Copenhafer et al. |
| 6,362,261 | B1|   | 3/2002  | Lange et al. |
| 8,114,374 | B2|   | 2/2012  | Blencoe et al. |
| 8,673,256 | B2| * | 3/2014  | Blencoe ................. B01D 53/62 423/419.1 |

FOREIGN PATENT DOCUMENTS

| CA | 2255287 A1 | 11/2000 |
| EP | 0070711 A1 | 1/1983 |
| WO | 9412266    | 6/1994 |

(Continued)

OTHER PUBLICATIONS

Haywood et al., 'Carbon Dioxide Sequestration as Stable Carbonate Minerals—Environmental Barriers' in Environmental Geology vol. 41 #1-2, pp. 11-16 (2001). (Year: 2001).*
O'Connor, 'Carbon Dioxide Sequestration by Direct Mineral Carbonation: Results from Recent Studies and Current Status' USDOE Office of Fossil Energy (2001). (Year: 2001).*
Seifritz, "CO2 disposal by means of silicates", Nature, vol. 345, Jun. 7, 1990, pp. 486.
Lackner et al., "Magnesite Disposal of Carbon Dioxide", 22nd International Technical Conference on Coal Utilization and Fuel System, pp. 1-12, Mar. 16, 1997.
Lackner et al., "Progress on Binding CO2 in Mineral Substrates", Energy Convers. Mgmt., vol. 38, suppl., pp. S259-S264, 1997.

(Continued)

*Primary Examiner* — Stuart L Hendrickson
(74) *Attorney, Agent, or Firm* — Scully, Scott, Murphy & Presser, P.C.

(57) ABSTRACT

In a preferred embodiment, the invention relates to a process of sequestering carbon dioxide. The process comprises the steps of: (a) reacting a metal silicate with a caustic alkali-metal hydroxide to produce a hydroxide of the metal formerly contained in the silicate; (b) reacting carbon dioxide with at least one of a caustic alkali-metal hydroxide and an alkali-metal silicate to produce at least one of an alkali-metal carbonate and an alkali-metal bicarbonate; and (c) reacting the metal hydroxide product of step (a) with at least one of the alkali-metal carbonate and the alkali-metal bicarbonate produced in step (b) to produce a carbonate of the metal formerly contained in the metal silicate of step (a).

10 Claims, No Drawings

(56) References Cited

FOREIGN PATENT DOCUMENTS

| WO | 0134294 A1 | 5/2001 |
|---|---|---|
| WO | 02085788 A1 | 10/2002 |

OTHER PUBLICATIONS

Goff et al., "Carbon Dioxide Sequestering Using Ultramafic Rocks", Environmental Geosciences, vol. 5, No. 3, pp. 89-101, 1998.

Goldberg et al., "A Program to Develop CO2 Sequestration via Mineral Carbonation", Proceedings of the 6th International Conference on Greenhouse Gas Control Technologies, Kyoto, Japan, pp. 1-6, Oct. 1, 2002.

Haywood et al., "Carbon dioxide sequestration as stable carbonate minerals—environmental barriers", Environmental Geology, Springer-Verlag (http://link.springer.de), 10 pages, Aug. 21, 2001.

Gerdemann et al., "Carbon Dioxide Sequestration by Aqueous Mineral Carbonation of Magnesium Silicate Minerals", Proceedings of the 6th International Conference on Greenhouse Gas Control Technologies, Kyoto, Japan, pp. 1-6, Oct. 1, 2002.

Guthrie et al., "Geochemical Aspects of the Carbonation of Magnesium Silicates in an Aqueous Medium", NETL Conference on Carbon Sequestration, pp. 1-14, 2001.

Xiaoding et al., "Mitigation of CO2 by Chemical Conversion: Plausible Chemical Reactions and Promising Products", Energy and Fuels, vol. 10, pp. 305-325, 1996.

Butt et al., "A Method for Permanent Disposal of CO2 in Solid Form", Wold Resource Review, vol. 9, No. 3, pp. 324-336, 1997.

Smithson et al., "Kinetics and Mechanism of Carbonation of Magnesium Oxide Slurries", Ind. Eng. Chem., Process Des. Develop, vol. 12, No. 1, pp. 99-106, 1973.

Bearat et al., "Magnesium Hydroxide Dehydroxylation/Carbonation Reaction Processes: Implications for Carbon Dioxide Mineral Sequestration", J. Am Ceram. Soc., vol. 85, No. 4, pp. 742-748, 2002.

Wu et al., "Feasibility of CO2 Fixation via Artificial Rock Weathering", Ind. Eng. Chem., Res., vol. 40, pp. 3902-3905, 2001.

Jia et al., Mineral Carbonation and ZECA, Proceedings of the 6th International Conference on Greenhouse Gas Control Technologies, Kyoto Japan, pp. 1-6, Oct. 1, 2002.

Kakizawa et al., "A new CO2 disposal process via artificial weathering of calcium silicate accelerated by acetic acid", Energy, vol. 26, pp. 341-354, 2001.

O'Connor et al., "Carbon Dioxide Sequestration: Aqueous Mineral Carbonation Studies Using Olivine and Serpentine", Albany Research Center, National Energy Technology Laboratory: Mineral Carbonation Workshop, Aug. 8, 2001, 35 pages.

Kojima et al., "Absorption and Fixation of Carbon Dioxide by Rock Weathering", Energy Convers. Mgmt., vol. 38, pp. S461-S466 (1997).

O'Connor et al., "Carbon Dioxide Sequestration by Direct Mineral Carbonation: Results from Recent Studies and Current Status", Proceedings of First National Conference on Carbon Sequestration, May 14, 2001, 12 pages.

Lackner et al., "Carbon Dioxide Disposal in Carbonate Minerals", Energy, vol. 20, No. 11, pp. 1153-1170, 1995.

Lackner, "A Guide to CO2 Sequestration", Science, vol. 300, pp. 1677-1678, Jun. 13, 2003.

O'Connor, W.K. et al, Carbon Dioxide Sequestration by Direct Mineral Carbonation: Results from Recent Studies and Current Statusr. Proceedings of National Conference on Carbon Sequestration. May 14, 2001. pp. 1-10.

* cited by examiner

CARBONATION OF METAL SILICATES FOR LONG-TERM CO$_2$ SEQUESTRATION

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

BACKGROUND OF THE INVENTION

Rising levels of carbon dioxide (CO$_2$) in the Earth's atmosphere, caused primarily by combustion of fossil fuels, have prompted concern that temperatures at the Earth's surface will increase sharply during the 20 century. To address this issue, numerous nations are developing plans for lowering CO$_2$ emissions to the atmosphere. The principal approaches under consideration are: improving energy efficiency; making greater use of alternative sources of energy; and developing economical viable technologies for capture, separation, and long-term storage of CO$_2$. The latter strategy, known as "CO$_2$ sequestration," is receiving increasing attention because it permits continued use of high-carbon fossil fuels to generate electrical power while ensuring that CO$_2$ releases to the atmosphere are reduced.

A potentially attractive means for CO$_2$ sequestration is injection of gaseous CO$_2$ into underground reservoirs, e.g., active or depleted oil and gas fields, deep brine formations, and subterranean coalbeds. The underlying premise of this approach is that, after injection, the CO$_2$ will remain sequestered in the host rock for hundreds, perhaps even thousands, of years. In practice, however, such long-term reservoir integrity cannot be guaranteed. If either gaseous CO$_2$ or CO$_2$-saturated formation water escapes to overlying strata or to the surface, underground and subaerial water supplies could become seriously contaminated, and/or large amounts of CO$_2$ could be released to the atmosphere.

Significantly, the reservoir-integrity problems associated with subterranean sequestration of gaseous or liquid CO$_2$ can be completely avoided by chemically binding CO$_2$ with suitable solid materials. This alternative CO$_2$ sequestration strategy, known as "mineral carbonation," involves reaction of CO$_2$ with naturally occurring silicates to produce solid carbonate compounds, such as calcite (CaCO$_3$) and magnesite (MgCO$_3$), for the purpose of long-term terrestrial isolation of CO$_2$. "Mineral carbonation" also implies a chemical process carried out at elevated temperatures and pressures in an industrial-scale reactor, because a similar term, "mineral trapping," alludes to crystallization of carbonate compounds at ambient temperature and pressure after CO$_2$ is injected into a subsurface geologic formation. The U.S. Department of Energy (DOE) classifies mineral carbonation as a "CO$_2$ conversion" technology, rather than a geological CO$_2$-sequestration strategy, because in mineral carbonation most, if not all, of the CO$_2$ is converted to one or more solid carbonate compounds, whereas in mineral trapping only a tiny fraction (generally less than one volume %) of the injected CO$_2$ is ultimately incorporated into solid carbonates.

Mineral carbonation has many important advantages over alternative methods for large-scale CO$_2$ sequestration. First, the carbonate compounds formed in the process are thermodynamically stable, environmentally benign, and weakly soluble in meteoric water. Consequently, they can be amended to soils to reduce acidity and increase moisture content, combined with stone to strengthen roadbeds, or simply dumped in a landfill. Alternatively, the carbonates could be returned to the site of excavation to fill the cavity created by soil/rock removal. Regardless of the particular end use or disposal scheme selected for the carbonates, the reacted CO$_2$ will remain tightly bound in the crystallographic structures of the carbonates, immobilized for an indefinite period of time. Therefore, a commercial mineral carbonation technology creates no major "legacy issues" for nearby population centers. In contrast, other proposed methods for wide-scale CO$_2$ sequestration, such as subsurface storage in brine formations, and disposal in deep-ocean realms, rely on risky environmental factors to ensure long-term CO$_2$ containment: an impervious, superjacent "caprock" in the case of subsurface injection of CO$_2$ into brine formations, and low ambient temperature and high ambient pressure, with no current-driven dispersal of the sequestration "agent" (liquid CO$_2$ or CO$_2$-hydrate), in the case of suboceanic CO$_2$ disposal.

In weighing the technical feasibility of CO$_2$ sequestration by mineral carbonation, it should be noted that huge masses of rocks and clay-rich formations suitable for carbonation occur worldwide. For example, ultramafic complexes and large serpentinite bodies are major sources of the magnesium-rich minerals olivine (forsterite) and serpentine, which can be carbonated by the reactions

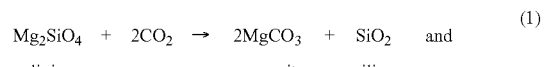
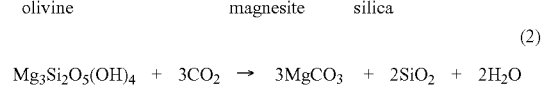

Moreover, contact-metamorphosed limestones frequently contain wollastonite (CaSiO$_3$), and large quantities of plagioclase [(Ca$_x$,Na$_{1-x}$)(Al$_{1+x}$Si$_{3-x}$)O$_8$] are present in many different types of common rocks. Wollastonite and plagioclase can be converted to calcite (plus silicious solid material) by the reactions

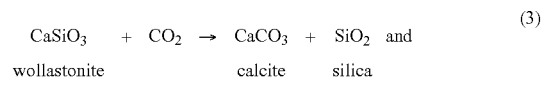
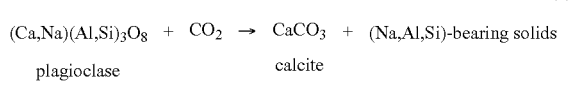

Another key attribute of mineral carbonation, in relation to other technologies that deal with CO$_2$ waste streams, is that costs associated with CO$_2$ transport are potentially very low. This is so because in an industrial-scale implementation of a mineral carbonation technology, the metal-silicate feedstock can be carbonated in commercial facilities located adjacent to, or near, large "point sources" of CO$_2$ generation, such as fossil fuel-fired power plants, cement factories, and steel mills. In contrast, CO$_2$ sequestration in deep brine aquifers, or the benthic regions of the world's major oceans, would often require CO$_2$ transport over substantial distances. Building and maintaining many miles of pipeline to achieve such transport, or hauling liquid CO$_2$ over long distances by truck, train or ship, would be extremely expensive and perhaps totally impractical.

Finally, the following additional advantages of mineral carbonation are noteworthy: (1) by technical necessity, mineral carbonation involves rapid conversion of $CO_2$ to solid carbonate(s), and (2) by virtue of creating one or more solid carbonate phases from a volatile phase rich in $CO_2$, carbonate crystallization automatically produces a large reduction in total volume. It has already been demonstrated by researchers at the Albany Research Center in Oregon, and the Los Alamos National Laboratory in New Mexico, that, with vigorous mechanical stirring, olivine and heat-pretreated serpentine can be quantitatively converted to magnesite (see Reactions 1 and 2 above) in ~30 minutes at 155° C. and 185 atm total (fluid) pressure. Significantly, the latter processing conditions are readily attained in modern industrial reactors. A large reduction in the total volume of the reactants ($CO_2$, plus one or more condensed phases, and often one or more "additives" and/or catalysts) is automatically achieved in mineral carbonation because the $CO_2$-bearing solids produced are >1000× more dense than gaseous $CO_2$ at STP (standard temperature and pressure: 25° C., 1 atm). This contraction essentially eliminates the "room problem" associated with storing large volumes of $CO_2$ (as a gas, liquid or supercritical fluid) in subsurface rock formations.

While it is evident that mineral carbonation offers many important advantages over competing $CO_2$ sequestration technologies, it is also true that it suffers two major disadvantages. Chief among these is the need to mine, or quarry, large quantities of silicate feedstock to sequester the gigatons of atmospheric $CO_2$ generated annually by combustion of fossil fuels. Excavating massive amounts of rock and soil to permit silicate carbonation at sites near major industrial sources of $CO_2$ will be expensive, and will require intense reclamation activities to restore the land to an environmentally acceptable state. However, there is no doubt that this can be accomplished using modern methods of environmental restoration. In addition, it is likely that new technologies will soon be developed to enable innovative synergies, and more satisfactory compromises, between large-scale energy production and traditional modes of land use.

The second major disadvantage of mineral carbonation is that elevated temperatures and pressures, and chemical "additives" and/or catalysts, are usually required to accelerate $CO_2$ conversion to one or more crystalline carbonates. While considerable success has already been achieved in carbonating olivine (Reaction 1) at commercially feasible temperatures and pressures, mineral carbonation experiments performed over the past four years at the Albany Research Center have shown that untreated serpentine does not react as readily (Reaction 2). To date, the only known remedy for sluggish serpentine carbonation is to heat-pretreat the mineral to 600-650° C. prior to carbonation, which drives off structurally bound water (hydroxyl groups). Tests of this altered (dehydroxylated) serpentine have shown that it is much more reactive than untreated (hydroxylated) serpentine. However, at a typical fossil fuel-fired power plant, heat treating serpentine at 600-650° C. prior to carbonation would require ~200 kW~hr of electricity per ton of serpentine feedstock. With one ton of carbon in a fossil fuel producing ~3.7 tons of $CO_2$, and each ton of $CO_2$ consuming ~2.0 tons of serpentine during carbonation, the power requirements for serpentine dehydroxylation represent 20-30% of total power output. This large energy penalty threatens the economic viability of $CO_2$ sequestration by serpentine carbonation.

It is evident from Reactions 3 and 4 that the problems plaguing serpentine carbonation would be partly or entirely avoided if a more abundant silicate mineral could be utilized. In this regard, it is noteworthy that wollastonite is carbonated by Reaction 3 at 60° C. using an aqueous solution of acetic acid as a catalyst. This result is of some scientific interest, but it fails to significantly bolster metal-silicate carbonation as a potential means for sequestering large masses of $CO_2$ because wollastonite, while not rare in nature, is typically found in significant quantities only in contact metamorphic aureoles where it tends, along with other silicates, to form small, isolated bodies adjacent to igneous intrusions. The other principal occurrence of wollastonite is as a widely disseminated mineral in regionally metamorphosed carbonate strata. Thus, wollastonite is not available in sufficient quantities to sustain a wide-scale silicate carbonation technology.

The low abundance of wollastonite leaves plagioclase as the major potential source of calcium (Reaction 4) to produce the quantities of carbonate required to sequester gigatons of $CO_2$ by metal-silicate carbonation. (Other, locally significant potential sources of calcium include Ca-rich clay deposits, Ca-rich fly ash, and waste concrete.) However, a commercially feasible plagioclase carbonation technology faces two formidable technical challenges. First, it is inherently difficult to extract calcium from plagioclase because, being a framework silicate with a three-dimensional structure held together by tightly bonded atoms of silicon and aluminum, plagioclase is not readily destabilized by firing at high temperatures, or easily "digested" (decomposed) by most customary solvents. Second, while most plagioclases contain a significant amount of calcium, Ca-contents are always less than that of wollastonite. Therefore, per ton of silicate feedstock, less calcium-rich carbonate (calcite) is formed from plagioclase than from wollastonite. These difficulties notwithstanding, it is clear that plagioclase carbonation merits serious scientific study to determine whether it could be an attractive alternative to serpentine carbonation in sequestering large quantities of $CO_2$.

SUMMARY OF THE INVENTION

In a preferred embodiment, the invention relates to a process of sequestering carbon dioxide. The process comprises the steps of: (a) reacting a metal silicate with a caustic alkali-metal hydroxide to produce a hydroxide of the metal formerly contained in the silicate; (b) reacting carbon dioxide with at least one of a caustic alkali-metal hydroxide and an alkali-metal silicate to produce at least one of an alkali-metal carbonate and an alkali-metal bicarbonate; and (c) reacting the metal hydroxide product of step (a) with at least one of the alkali-metal carbonate and the alkali-metal bicarbonate produced in step (b) to produce a carbonate of the metal formerly contained in the metal silicate of step (a).

The invention also relates to a system for sequestering carbon dioxide from a gas stream. The system comprises a gas stream containing carbon dioxide, a first reaction chamber for reacting a metal silicate with a caustic material to produce a hydroxide of the metal, and a second reaction chamber for contacting the metal hydroxide with the gas stream containing the carbon dioxide to produce a carbonate of the metal.

The invention also relates to a system for carbonating a metal silicate. The system comprises: (a) a supply of the metal silicate entering the system; (b) a source of carbon dioxide entering the system; (c) a reactor structured for converting the metal silicate to a metal carbonate and silica with the use of a caustic material, and With the use of the carbon dioxide; and (d) the metal carbonate and the silica exiting the system as separate products.

The invention also relates to a system for recovering a useful metal from rock. The system comprises: (a) a supply of rock entering the system, the rock containing the useful metal and a metal silicate; (b) a source of carbon dioxide entering the system; (c) a reactor structured for converting the metal silicate to a metal carbonate, with the use of a caustic material, and with the use of the carbon dioxide; (d) apparatus for removing the useful metal from the rock; (e) a stream of the metal carbonate exiting the system; and (f) a stream of the useful metal exiting the system.

The invention also relates to a process of carbonating a metal silicate. The process comprises the steps of: (a) reacting the metal silicate with a caustic material to produce a hydroxide of the metal; (b) reacting the metal hydroxide with a source of carbon dioxide to produce a carbonate of the metal and to produce reconstituted caustic material; and (c) introducing the caustic material from step (b) into step (a).

The invention also relates to a process of carbonating a metal silicate. The process comprises reacting at least the metal silicate and a source of carbon dioxide to produce a carbonate of the metal, wherein the reaction is conducted at a pressure not greater than about 50 bars above the vapor pressure of pure water for the temperature of the reaction.

The invention also relates to a process of carbonating a metal silicate. The process comprises the steps of: (a) reacting the metal silicate with a caustic alkali-metal hydroxide to produce a hydroxide of the metal formerly contained in the silicate; and (b) reacting the metal hydroxide with a source of carbon dioxide to produce a carbonate of the metal formerly contained in the metal silicate of step (a).

The invention also relates to a process of producing a metal carbonate. The process comprises reacting an alkaline-earth metal hydroxide with at least one of an alkali-metal carbonate, an alkali-metal bicarbonate, and carbon dioxide, to produce a carbonate of the metal formerly contained in the metal hydroxide.

The following detailed discussion will make the advantages of the invention apparent to the informed reader.

DETAILED DESCRIPTION OF THE INVENTION

Many different types of metal-silicate feedstocks are amenable to carbonation by the invented process, including naturally occurring silicates such as those present in rocks and clay-rich formations, as well as silicates present in industrial waste products such as fly ash and waste concrete. Typically, the metal-silicate feedstock is composed of one or more calcium silicates, magnesium silicates, iron-bearing silicates (such as basalt), or mixtures thereof, although other types of silicates can also be used. Some nonlimiting examples of these silicates are described below. (Silicate feedstocks are referred to collectively herein as "metal silicates" with the understanding that this designation includes any natural or man-made material, in the crystalline or amorphous state, that contains at least one metal along with silicon. By this definition, aluminosilicates are metal silicates because they contain a metal, aluminum, along with silicon.)

Calcium silicates include wollastonite ($CaSiO_3$), calcic plagioclase [e.g., anorthite [$(Ca_x,Na_{1-x})(Al_{1+x}Si_{3-x}O_8$, where $x \geq 0.9$, and labradorite [$(Ca_x,Na_{1-x})Al_{1+x}Si_{3-x}O_8$, where $0.5 \leq x \leq 0.7$], calcium-rich fly ash, basalt (a volcanic rock rich in Ca, Mg and Fe), calcium-rich montmorillonite [nominally ($\frac{1}{2}Ca,Na)_{0.7}(Al,Mg,Fe)_4[(Si,Al)_8O_{20}](OH)_4 \cdot nH_2O$] and waste concrete. Contact-metamorphosed limestones frequently contain wollastonite, large quantities of calcic plagioclase are present in many different types of common rocks, and calcium-rich montmorillonite is found in special types of clay deposits. Basalt is a common rock in many terrestrial locations, and on the floors of the world's major oceans.

Magnesium-rich silicates include olivine (specifically forsterite, $Mg_2SiO_4$), serpentine [$Mg_3Si_2O_5(OH)_4$], and basalt. Significant masses of olivine- and serpentine-bearing rocks exist around the world, particularly in ultramafic complexes, and in large serpentinite bodies.

Iron-bearing silicates include fayalite, $Fe_2SiO_4$, and various natural glasses (e.g., basaltic glass).

The metal silicates used as feedstocks for the process can have a wide range of initial particle sizes. Typically, it is desirable to reduce the particle size of the metal silicate(s) prior to chemical treatment. For example, the particle size of the metal silicate(s) may be reduced to an average diameter of less than about 100 microns. Any suitable equipment can be used to reduce particle size.

The process can optionally be conducted without heat pretreatment of the metal silicate feedstock.

In a preferred embodiment of the invention, one or more metal silicates are transformed to one or more solid hydroxides by reaction with a caustic alkali-metal hydroxide, such as caustic soda (NaOH), in aqueous solution. This is the first step of a preferred process; i.e., the metal silicate(s) react with a caustic alkali-metal hydroxide to produce a hydroxide of the metal formerly contained in the silicate. This initial reaction is usually followed by physical and chemical segregation of the produced solid(s) and "depleted" caustic liquid. In addition, it may be desirable to separate the solid metal hydroxide(s) from any residual solid silicate and/or oxide material that forms as a byproduct of caustic digestion.

Any suitable concentration of the caustic alkali-metal hydroxide in aqueous solution can be used to decompose the metal-silicate feedstock, including highly concentrated and very dilute solutions. The caustic solution is typically fairly concentrated, comprising, by weight, from about 30% to about 80% NaOH and from about 20% to about 70% water.

In the final step of the preferred process, the metal hydroxide formed in the first step is reacted with alkali-metal carbonate (e.g., sodium carbonate) and/or alkali-metal bicarbonate (e.g., sodium bicarbonate) to produce a carbonate of the metal formerly contained in the metal silicate. This reaction can be induced at any suitable set of temperature-pressure conditions.

An intermediate step in the preferred process involves reacting carbon dioxide with caustic alkali-metal hydroxide (e.g., NaOH) and/or alkali metal silicate (e.g., $Na_2SiO_3$) to produce alkali-metal carbonate (e.g., $Na_2CO_3$) and/or alkali-metal bicarbonate (e.g., $NaHCO_3$), ±water and/or silica in either gelatinous or solid form. This step may or may not be followed by precipitation of the $Na_2CO_3$ and/or $NaHCO_3$, which could be achieved by shifting the pH of the aqueous solution, or by evaporating off some of the water present.

When all of the foregoing steps are carried out using straight flue gas as a source of $CO_2$, capture, separation and sequestration of that gas is achieved in a single, integrated operation.

Advantageously, the caustic material produced in the intermediate step of the process can usually be recycled back into the first step of the process. Thus, more generally, the invention relates to a process of carbonating a metal silicate which comprises the steps of: (a) reacting the metal silicate with a caustic material to produce a hydroxide of the metal; (b) reacting the metal hydroxide with a source of carbon dioxide to produce a carbonate of the metal and to produce reconstituted caustic material; and (c) introducing the caustic material from step (b) into step (a). The caustic material can be a caustic alkali-metal hydroxide or any other suitable caustic material.

It has been discovered by the inventors that the intermediate and final steps of the process can be conducted at a pressure not greater than about 50 bars above the vapor pressure of pure water for the temperature of these two steps, typically not greater than about 30 bars, and more typically not greater than about 20 bars, and often not greater than about 10 bars. The initial step can be conducted at a pressure slightly below the vapor pressure of pure water for the temperature of that step. Achieving rapid chemical reaction at low pressure is a key technological advantage because relatively thin-walled pressure chambers will suffice to safely contain the aqueous liquids (±gas) as reaction proceeds. This will reduce the costs of commercial reactors built to implement the process on an industrial scale. Moreover, when total pressure is equal to the vapor pressure of the liquid phase, no investments in expensive pressure-intensifying equipment are required. On the other hand, higher fluid (liquid and/or gas) pressures at each step, particularly the intermediate step, could lead to more rapid and efficient chemical reaction, in which case additional capital expenditures to make the carbonation reactor more structurally robust, and to procure suitable pumping equipment, might be cost effective.

More generally, the invention relates to a process of carbonating a metal silicate. The process comprises reacting at least the metal silicate and a source of carbon dioxide to produce a carbonate of the metal, wherein the reaction is conducted at a pressure not greater than about 50 bars above the vapor pressure of pure water for the temperature of the reaction.

However, it may be beneficial to pressurize the $CO_2$-bearing gas to a level above the vapor pressure of pure water for the temperature of the step in which it is reacted, prior to, or during, production of metal carbonate(s) and/or metal bicarbonate(s) in order to accelerate rates of carbonation. If $CO_2$ is captured, separated and liquified by a another process, then pressures up to ~64 atm (the vapor pressure of pure liquid $CO_2$ at 25° C.) could be achieved simply by throttling flow of $CO_2$ into the pressure chamber used to achieve carbonation.

In each step of the preferred process, the extent to which aqueous liquids are agitated or stirred, and control of the proportions of phases as reaction proceeds, can be varied. In general, chemical reaction is accelerated by vigorously agitating or rapidly stirring the reactants as processing proceeds, and by maintaining high fluid/solid ratios.

More generally, the invention relates to a process of carbonating a metal silicate which comprises the steps of: (a) reacting the metal silicate with a caustic alkali-metal hydroxide to produce a hydroxide of the metal formerly contained in the silicate; and (b) reacting the metal hydroxide with a source of carbon dioxide to produce a carbonate of the metal formerly contained in the metal silicate of step (a). The invention also relates to a process of producing a metal carbonate. This process comprises reacting an alkaline-earth metal hydroxide with at least one of an alkali-metal carbonate, an alkali-metal bicarbonate, and carbon dioxide, to produce a carbonate of the metal formerly contained in the metal hydroxide.

Some examples of reaction pathways for carbonating particular kinds of metal silicates are described below. It should be recognized that the invention is not limited to these specific examples.

The invented process is advantageously used to carbonate calcium silicates. For wollastonite (nominally $CaSiO_3$), the processing reactions are:

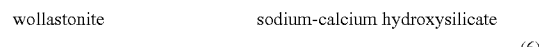
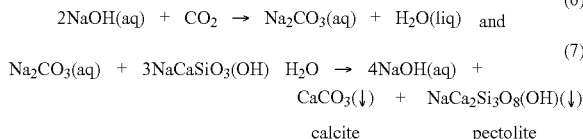

(aq=aqueous, ↓=precipitate, liq=liquid), respectively. For anorthite ($CaAl_2Si_2O_8$), the processing reactions are:

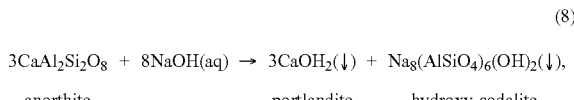
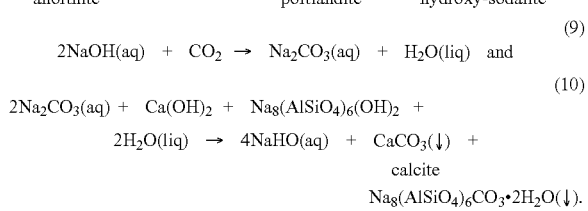

(Other Ca-rich aluminosilicates carbonate by reactions similar to those for anorthite, with concomitant formation of various kinds of residual solid materials.) The NaOH "regenerated" in the third step of the process (e.g., Reactions 7 and 10) can be recycled to decompose additional calcium silicate in step 1 (e.g., Reactions 5 and 8), or to form additional $Na_2CO_3$ in step 2 (e.g., Reactions 6 and 9). Table 1 presents the results of experiments, performed by the inventors, that confirm Reactions 5-10.

In step 1 of the calcium-silicate carbonation processes (e.g., Reactions 5 and 8), a solid, calcium-rich silicate feedstock is decomposed in an aqueous solution of caustic soda to produce crystalline sodium-calcium hydroxysilicate, or crystalline portlandite and crystalline hydroxy-sodalite. This step is followed by physical and chemical segregation of the precipitated solid(s) and "depleted" caustic liquid. In step 2 (e.g., Reactions 6 and 9), carbon dioxide is injected into a NaOH-bearing aqueous liquid, creating aqueous $Na_2CO_3$ and water. In step 3 (e.g., Reactions 7 and 10), the $Na_2CO_3$ generated in step 2 is reacted with the crystalline hydroxide(s) formed in step 1 to produce aqueous NaOH; and either crystalline calcite+crystalline pectolite, or crystalline calcite+crystalline carbonate-cancrinite. These solid reaction products are thermodynamically stable, environmentally benign, and sparingly soluble in meteoric water.

The invented process also converts magnesium-rich silicates to magnesium-rich carbonates. For example, the following process reactions produce magnesite ($MgCO_3$) from the magnesium-rich minerals olivine (specifically forsterite, $Mg_2SiO_4$) and serpentine [$Mg_3Si_2O_5(OH)_4$]:

(11)
$$Mg_2SiO_4 + 2NaOH(aq) + H_2O(liq) \rightarrow 2Mg(OH)_2(\downarrow) + Na_2SiO_3(aq)$$
olivine — brucite

(12)
$$Na_2SiO_3(aq) + 2CO_2 + H_2O(liq) \rightarrow 2NaHCO_3(aq) + SiO_2(\downarrow)$$

(13)
$$2Mg(OH)_2 + 2NaHCO_3(aq) \rightarrow 2MgCO_3(\downarrow) + 2NaOH(aq) + 2H_2O(liq)$$
brucite — magnesite

[Net reaction: $Mg_2SiO_4 + 2CO_2 \rightarrow 2MgCO_3(\downarrow) + SiO_2(\downarrow)$], and

(14)
$$Mg_3Si_2O_5(OH)_4 + 2NaOH(aq) \rightarrow 3Mg(OH)_2(\downarrow) + Na_2SiO_3(aq) + SiO_2$$
serpentine — brucite

(15)
$$Na_2SiO_3(aq) + 2CO_2 + H_2O(liq) \rightarrow 2NaHCO_3(aq) + SiO_2(\downarrow)$$

(16)
$$2Mg(OH)_2 + 2NaHCO_3(aq) \rightarrow 2MgCO_3(\downarrow) + 2NaOH(aq) + 2H_2O(liq)$$
brucite — magnesite

(17)
$$Mg(OH)_2 + CO_2 \rightarrow MgCO_3(\downarrow) + H_2O(liq)$$
brucite — magnesite

[Net reaction: $Mg_3Si_2O_5(OH)_4 + 3CO_2 \rightarrow 3MgCO_3(\downarrow) + 2SiO_2(\downarrow) + 2H_2O(liq)$]. Table 2 presents the results of experiments, performed by the writers, that confirm Reactions 11-17.

A key observation concerning Reaction 14 is that no heat pretreatment of the serpentine is required to achieve rapid and efficient production of $Mg(OH)_2$. This contrasts sharply with the so-called "direct" method for carbonating serpentine (by the reaction $Mg_3Si_2O_5(OH)_4 + 3CO_2 \rightarrow 3MgCO_3 + 2SiO_2 + 2H_2O$), which requires heat pretreatment of the serpentine at ~600° C. to drive off structurally bound water. This extra step is necessary in the direct method of carbonating serpentine because water-bearing (hydroxylated) serpentine reacts sluggishly with $CO_2$, whereas dewatered (dehydroxylated) serpentine is highly reactive. Dehydroxylation of serpentine makes the direct carbonation method very energy intensive and costly. In this regard, it is also noteworthy that the invented process, as applied to either olivine or serpentine, completely conserves the "rock solvent" (e.g., NaOH), which lowers overall processing costs. By contrast, in the direct method for carbonating serpentine and olivine, the rock solvent is (effectively) compressed, supercritical $CO_2$, which is expensive to create due to the high capital and operating costs of the mechanical pumping that is required to achieve pressures as high as 185 atm.

Another important discovery made by the inventors is that $Mg(OH)_2$ can be reacted with $Na_2CO_3$ at 200° C. and elevated $CO_2$ fugacities to form the double carbonate eitelite [$Na_2Mg(CO_3)_2$] (see Table 2), which contains twice as much $CO_2$ as magnesite ($MgCO_3$). Crystallization of eitelite would permit twice as much $CO_2$ to be sequestered per ton of mined Mg-rich rock. In addition, like magnesite, eitelite is thermodynamically stable, environmentally neutral, and only weakly soluble in meteoric water. However, a disadvantage of eitelite crystallization is that caustic soda is not "regenerated" simultaneously, as it is when magnesite crystallizes (see Reactions 13 and 16). Therefore, when either olivine or serpentine is used to produce eitelite, the cost-savings achieved by reducing the tonnage of mined Mg-rich rock are offset to a significant extent by the continuous need to replenish the supply of NaOH that is used to decompose the metal-silicate feedstock.

It should be clearly understood that the chemical formulae for the solutes (substances dissolved in aqueous solution) in Reactions 11-13 and 14-16 (specifically NaOH, $Na_2SiO_3$ and $NaHCO_3$) represent stoichiometric components in aqueous solution, not "real" aqueous species. This convention was adopted (see also Reactions 5-7 and 8-10) for the sake of generality and simplicity. The particular species in aqueous solution created by our process (presently unknown) are of considerable scientific interest; however, they need not be represented explicitly in sets of process reactions such as those above, because the solids that form and disappear in each process reaction, as well as the net carbonation reaction for each metal silicate, do not depend on the chemical formulae that are used to represent the compositions of solutes. A simple example serves to illustrate this point. In Reactions 11-13, the stoichiometric components NaOH, $Na_2SiO_3$ and $NaHCO_3$ can be replaced by the ionic species OH$^-$, $SiO(OH)_3^-$, and $HCO_3^-$, with sodium ion omitted because it is neither consumed nor produced in any reaction. This leads to the following alternative carbonation pathway for forsteritic olivine:

$$Mg_2SiO_4 + OH^- + 3H_2O \rightarrow 2Mg(OH)_2 + SiO(OH)_3^- \quad (18)$$

$$SiO(OH)_3^- + CO_2 \rightarrow HCO_3^- + SiO_2(\downarrow) + H_2O \quad (19)$$

$$Mg(OH)_2 + HCO_3^- \rightarrow MgCO_3(\downarrow) + OH^- + H_2O \quad (20)$$

$$Mg(OH)_2 + CO_2 \rightarrow MgCO_3(\downarrow) + H_2O \quad (21)$$

[Net reaction: $Mg_2SiO_4 + 2CO_2 \rightarrow 2MgCO_3(\downarrow) + SiO_2(\downarrow)$]. Comparing Reactions 18-21 with Reactions 11-13, it is evident that the solids consumed and produced, and the net reaction, are identical. Therefore, it should be clearly understood that the scope of our process for carbonating metal silicates includes various self-consistent sets of reactions—i.e., sets of reactions involving the same solids, with metal silicate digestion by one or more caustic metal hydroxides (such as NaOH)—wherein solutes are represented by aqueous species of varying composition and charge, rather than by stoichiometric components.

The invented process may also convert iron-bearing silicates to iron-bearing carbonates, following carbonation pathways similar to those described above for Ca- and Mg-rich silicates. This is illustrated below for the iron-bearing silicate fayalite, $Fe_2SiO_4$:

(22)
$$Fe_2SiO_4 + 2NaOH(aq) + H_2O(liq) \rightarrow 2Fe(OH)_2(\downarrow) + Na_2SiO_3(aq)$$
fayalite

(23)
$$Na_2SiO_3(aq) + 2CO_2(gas) + H_2O(liq) \rightarrow 2NaHCO_3(aq) + SiO_2(\downarrow)$$

[Net reaction: $Fe_2SiO_4+2CO_2 \rightarrow 2FeCO_3(\downarrow)+SiO_2(\downarrow)$]. It is likely that similar reactions will convert Fe-bearing silicate glasses (e.g., basaltic glass) to one or more Fe-bearing carbonates.

In another embodiment of the invention, Ca-rich silicates are carbonated in a single step. In this alternative carbonation pathway, the silicate feedstock, aqueous NaOH, and $Na_2CO_3$ are reacted to produce crystalline calcite±crystalline sodium-calcium hydroxysilicate±crystalline hydroxy-sodalite±crystalline carbonate-cancrinite±residual silicate material. For example, using a concentrated aqueous solution of caustic soda (such as 50 weight percent NaOH in $H_2O$) as the silicate solvent, and by adding abundant sodium carbonate to that solution to serve as a source of $CO_2$, the aluminum-bearing calcium silicates anorthite and labradorite react with NaOH and $Na_2CO_3$ to form crystalline calcite±crystalline hydroxy-sodalite±residual aluminosilicate material at 200° C. and a total (fluid) pressure <15 atm (see Table 1).

The single-step process for carbonating Ca-rich silicates is simpler than the three-step process described earlier, because physical and chemical segregation of the solids and liquids is not required. However, the one-step process has the disadvantage that carbonate-cancrinite is typically not among the solids that are produced. (In the "one-step" experiments performed by the inventors using Ca-rich silicates as a source of calcium, carbonate-cancrinite was only observed in experiments performed with Ca-rich fly ash.) A plausible explanation for this is that the aqueous fluids produced in one-step experiments were typically too basic to allow carbonate-cancrinite to crystallize. Therefore, in an industrial-scale implementation of the one-step process, it may be desirable, at some point, to lower the pH of the aqueous fluid to increase the possibility that carbonate-cancrinite will be produced. The formation of carbonate-cancrinite significantly increases the total "$CO_2$-loading" of the solids produced, and therefore leads to more efficient and cost-effective carbonation of the Ca-silicate feedstock.

In still another embodiment, the invention provides a means for carbonating magnesium and iron silicates in two steps. In step 1, the metal silicate(s) is (are) converted to $Mg(OH)_2$ and/or iron hydroxides(s)+$Na_2SiO_3 \pm SiO_2$ by reaction with caustic soda in aqueous solution (e.g., Reactions 11, 14 and 22). When this conversion is essentially complete, carbonation of $Mg(OH)_2$ and/or iron hydroxide(s) is (are) achieved by injecting $CO_2$ into the aqueous solution to form $NaHCO_3$ (±$Na_2CO_3$)+silica gel and/or solid silica (step 2). $MgCO_3$ is formed when the $Mg(OH)_2$ produced in step 1 reacts with $NaHCO_3$ (±$Na_2CO_3$) and/or aqueous $CO_2$ (e.g., Reactions 13, 16 and 24).

Physical and/or chemical segregation of solids and liquids is not required in the two-step process for carbonating Mg- and Fe-rich silicates; therefore, it is intrinsically simpler than the three-step process for carbonating forsteritic olivine (Reactions 11-13), and the four-step process for carbonating serpentine (Reactions 14-17). On the other hand, the two-step process has the disadvantage that silica and magnesite are produced simultaneously. It should be recognized that Reactions 11-13 and 14-17 produce separate "streams" of gelatinous/solid silica and crystalline magnesite, which allows each substance to be used as a feedstock for various commercial applications. In contrast, the two-step process for carbonating magnesium and iron silicates generates a single stream of solid material, consisting of intimately mixed gelatinous/solid silica and crystalline magnesite. This creates two difficulties. First, gelatinous silica (if formed) is readily mobilized by meteoric water, and is therefore an inherently undesirable waste product for near-surface terrestrial disposal. Second, when silica (in any form) and magnesite are intimately mixed, the high cost of separation effectively precludes any value-added commercial applications of each substance. Therefore, compared to separate masses of its individual components, an intimate mixture of silica and magnesite is an economic and environmental liability.

The invention also relates to a system for sequestering carbon dioxide from a gas stream. The system includes a gas stream containing carbon dioxide, for example, a flue gas containing carbon dioxide or a stream of pure carbon dioxide gas. The system also includes a first reaction chamber for reacting a metal silicate with a caustic material to produce a hydroxide of the metal. The caustic material can be a caustic alkali-metal hydroxide, as discussed above, or any other caustic material suitable for the reaction. The system also includes a second reaction chamber for contacting the metal hydroxide with the gas stream containing the carbon dioxide to produce a carbonate of the metal. The first and second reaction chambers can be located in the same reactor or in different reactors. More than two reaction chambers can optionally be used in the system.

The invention also relates to a system for carbonating a metal silicate. The system includes a supply of the metal silicate entering the system, and a source of carbon dioxide entering the system. The source of carbon dioxide can be a gas stream containing carbon dioxide, or it can be a compound containing carbon dioxide, such as an alkali-metal carbonate or bicarbonate. The system also includes a reactor structured for converting the metal silicate to a metal carbonate and silica with the use of a caustic material, and with the use of the carbon dioxide. Any suitable caustic material can be used, such as a caustic alkali-metal hydroxide. The reaction can include other reactants in addition to the metal silicate, the caustic material and the carbon dioxide. The metal carbonate and the silica exit the system as separate products. In a preferred embodiment, the metal silicate is magnesium silicate and the metal carbonate is magnesite. Typically, the magnesite and the silica exiting the system have a purity of at least about 90%. This is economically advantageous, and it contrasts with previously known processes that produce mixtures of magnesite and silica.

The invention also relates to a system for recovering a useful metal from rock. The system includes a supply of rock entering the system, the rock containing the useful metal and a metal silicate, and a source of carbon dioxide entering the system. The system also includes a reactor structured for converting the metal silicate to a metal carbonate, with the use of a caustic material, and with the use of the carbon dioxide. As discussed above, any suitable caustic material can be used, and the source of carbon dioxide can be a gas containing carbon dioxide or a compound containing carbon dioxide. The system also includes apparatus for removing the useful metal from the rock. The apparatus can be located at any suitable location in the system. For example, magnetic apparatus can be used for removing magnetite from serpentine prior to the reactor. Alternatively, the reactor can produce the metal carbonate and a remaining rock portion, and the system can include apparatus for removing the useful metal from the remaining rock portion at a location subsequent to the reactor. The system also includes a stream of the metal carbonate exiting the system, and a stream of the useful metal exiting the system. The streams can be in any form, such as truckloads, trainloads, or other means of conveying the metal carbonate and the useful metal from the system.

The carbonation pathways for Ca-, Mg- and Fe-rich silicates described above are similar to, but distinctly different from, the commercial chemical processes that are used to extract alumina ($Al_2O_3$) from bauxite (aluminum ore), and to generate caustic soda from trona (a rock rich in sodium carbonate, $Na_2CO_3$). In the treatment of bauxite ore by the well-known Bayer Process, caustic soda is used to remove reactive silica and iron oxides, and to dissolve aluminum oxides (gibbsite, boehmite and diaspore). Dissolution of silica by the caustic solution produces sodium silicate (nominally $Na_2SiO_3$), which quickly reacts with sodium aluminate ($NaAlO_2$) to form crystalline hydroxysodalite [$Na_8(AlSiO_4)_6(OH)_2$]. This desilication of the solution is detrimental to the overall process because it consumes caustic soda, and the total mass of dissolved sodium aluminate is lowered. (With less sodium aluminate in solution, less high-purity gibbsite is precipitated in a later stage of the process, and as a second consequence, less caustic soda is regenerated by gibbsite precipitation. Regenerated caustic soda is recycled in the Bayer Process to treat additional batches of bauxite ore.)

While the Bayer Process has several characteristics in common with the process described in this document—in particular, the use of caustic soda to decompose the metal-bearing, solid feedstock, and regeneration of caustic soda at a subsequent stage of the process—two major differences are also evident. The first is that the goals of the two processes are totally different: the Bayer Process was developed to produce a solid concentrate rich in aluminum (precipitated gibbsite), whereas the principal intent of the invented metal-silicate carbonation process is to form stable metal-carbonate compounds for long-term $CO_2$ sequestration. Due to this key difference, the "ore" used for the two processes is much different. In the Bayer Process, deeply weathered, unconsolidated rock material is reacted because it is rich in alumina and poor in silica. In the present invention, the silica content of the metal-silicate feedstock is not a significant factor, except that a greater silica content generally means a lower Ca, Mg and/or Fe content, which is undesirable. The second key difference is that, in the present invention, caustic soda is regenerated during crystallization of one or more solid metal carbonates, whereas in the Bayer Process, caustic soda is regenerated during the production of high-purity gibbsite.

In the commercial process of reacting trona with lime (CaO) to produce caustic soda plus calcite, the intent is solely to produce caustic soda; the entire amount of calcite formed as a byproduct is subsequently calcined to regenerate lime, which is recycled for reaction with additional batches of trona ore to produce more caustic soda. Thus, there is no $CO_2$ sequestration achieved in the commercial treatment of trona. Moreover, trona contains little or no silica and alumina; consequently, its treatment to generate caustic soda does not consume or produce any significant amount of silicate material.

The invented metal-silicate carbonation process may have the following practical uses and benefits:

$CO_2$ sequestration. The process was designed mainly to produce crystalline carbonates that persist indefinitely in most continental settings. The results of autoclave experiments presented in Tables 1 and 2 demonstrate that, under suitable conditions: Ca-rich silicates are readily converted to calcite ($CaCO_3$)±carbonate-cancrinite [$Na_8(AlSiO_4)_6CO_3.2H_2O$], and Mg-rich silicates are quickly transformed to magnesite ($MgCO_3$) and/or eitelite [$Na_2Mg(CO_3)_2$]. These four crystalline carbonate compounds bind $CO_2$ indefinitely in most non-acidic terrestrial environments, and are completely harmless to all flora and fauna.

Neutralization of highly acidic soils. Locally, calcium and magnesium carbonates can have commercial value as soil amendments. While adding carbonates to highly acid soils to increase pH ultimately releases $CO_2$ to the atmosphere, significant environmental and economic benefits would accrue if the treated land was made more biologically productive. The amended soils might be used to grow crops or trees, either of which could have a total carbon sequestration potential higher than that of the crystalline carbonate amendment. Using calcium and magnesium carbonates for this purpose would also lessen demand for lime produced by calcining limestone, and this would help lower $CO_2$ emissions to the atmosphere.

Recovery of useful metals. Many rock formations contain useful metals (e.g., iron, copper, nickel and platinum) at concentrations that are currently uneconomical to mine. If, however, mining and grinding were already being performed to create a metal-silicate feedstock for carbonation, one or more metals that are not carbonated could be extracted as a byproduct(s), thereby reducing the costs of metal-silicate carbonation.

Elimination of hazardous mine tailings. Mine tailings, consisting of crushed rock material from which metals or other valuable materials have been extracted—along with the "overburden" (soil and regolith) that is removed to access buried ore horizons—are an important waste problem for many active and abandoned mines. Thus, it is significant that a nearby mineral carbonation reactor might be able to use them as a source of calcium and magnesium. This would enhance environmental restoration, and reduce the costs of mining metal silicate(s) for carbonation.

Production of high-purity silica. When olivine and/or serpentine is (are) carbonated by the invented process, the solid effluent produced in step 2 (Reactions 12 and 15) is high-purity silica, which can be refined for use in manufacturing silica-based desiccants, silica brick, silicon carbide, and various types of glass. High-purity silica is also a potential source of elemental silicon the foundation material for numerous semiconducting electronic devices. Finally, it may be possible to use amorphous silica to form melanophlogite, a silica-rich compound with a cage structure that can accommodate as many as six $CO_2$ "guest" molecules for every 46 molecules of $SiO_2$. Creation of substantial amounts of melanophlogite would significantly increase the total $CO_2$-loading of the solids generated by the invented process.

Production of high-purity magnesite. When olivine and/or serpentine is (are) carbonated by the invented process, the solid effluent produced in step 3 for olivine carbonation (Reaction 13) and in steps 3 and 4 for serpentine carbonation (Reactions 16 and 17) is high-purity magnesite, which can be used to produce magnesite cement.

Capture and separation of $CO_2$ from flue gas. Another potential application of the invented process is especially important, as it would greatly reduce costs associated with capture and separation of $CO_2$ at fossil fuel-fired power plants, cement factories, and steel mills. Specifically, step 2 in the process (e.g., Reactions 6, 9, 12 and 15) permits $CO_2$ to be captured and separated from flue gas by bubbling the gas through a NaOH— and/or $Na_2SiO_3$-bearing aqueous liquid. The $CO_2$ would be transformed to aqueous ±crystalline $Na_2CO_3$ and/or $NaHCO_3$, and the nitrogen-rich gas effluent could either be refined to produce high-purity nitrogen for commercial use, or simply released harmlessly to the atmosphere.

TABLE 1

Results of Experiments with Solid Calcium Silicates

| Date/ Duration[@] | Starting Materials[@,#] | Temperature/ Pressure | XRD Number | Solid Run Products, and Initial/Final Solution pH[&] |
|---|---|---|---|---|
| Jul. 10, 2002/ 72 hrs | anorthite + NaOH + $H_2O$ | 200° C./ <15 atm | LMAS001-2 LMAS003 | portlandite + hydroxy-sodalite + hydrogrossularite(?) |
| Aug. 1, 2002/ 72 hrs | anorthite + NaOH + $Na_2CO_3$ + $H_2O$ | 200° C./ <15 atm | LMA059 | calcite + hydroxy-sodalite |
| Oct. 4, 2002/ 72 hrs | prereacted anorthite + $Na_2CO_3$ + $H_2O$ | 200° C./ <15 atm | LMA070 | calcite + carbonate-cancrinite, pH: 12.5/≥14 |
| Aug. 20, 2002/ 72 hrs | labradorite + NaOH + $H_2O$ | 200° C./ <15 atm | LMA060 | portlandite + hydroxy-sodalite + cancrinite + hydrogrossular(?) |
| Aug. 28, 2002/ 72 hrs | labradorite + NaOH + $Na_2CO_3$ + $H_2O$ | 200° C./ <15 atm | LMA061 | calcite + hydroxy-sodalite + hydrogrossular + minor AUCP, pH: 12.5/≥14 |
| Oct. 8, 2002/ 72 hrs | prereacted labradorite + $Na_2CO_3$ + $H_2O$ | 200° C./ <15 atm | LMA071 | calcite + carbonate-cancrinite, pH: 12.5/≥14 |
| Nov. 8, 2002/ 72 hrs | $Ca(OH)_2$ + $Mg(OH)_2$ + $Na_2CO_3$ + $H_2O$ | 200° C./ <15 atm | LMA077 | calcite + brucite, pH: 12.5/≥14 |
| Nov. 26, 2002/ 72 hrs | wollastonite + NaOH + $H_2O$ | 200° C./ <15 atm | LMA081 | sodium-calcium hydroxysilicate |
| Dec. 2, 2002/ 72 hrs | wollastonite + NaOH + $Na_2CO_3$ + $H_2O$ | 200° C./ <15 atm | LMA083 | calcite + sodium-calcium hydroxysilicate, pH: 12.5/≥14 |
| Dec. 10, 2002/ 72 hrs | Ca-rich fly ash + NaOH + $H_2O$ | 200° C./ <15 atm | LMA084 | sodalite + AUCP |
| Dec. 13, 2002/ 72 hrs | Ca-rich fly ash + NaOH + $Na_2CO_3$ + $H_2O$ | 200° C./ <15 atm | LMA085 | calcite + carbonate-cancrinite + sodalite + AUCP, pH: 12.5/≥14 |
| Dec. 17, 2002/ 72 hrs | $Ca(OH)_2$ + $Na_2CO_3$ + $H_2O$ | 200° C./ <15 atm | LMA089 | calcite, pH: 12.5/≥14 |
| Jan. 3, 2003/ 72 hrs | prereacted wollastonite + NaOH + $Na_2CO_3$ + $H_2O$ | 200° C./ <15 atm | LMA094 | calcite + pectolite, pH: 12.5/≥14 |
| Sep. 16, 2002/ 72 hrs | basalt + NaOH + $H_2O$ | 200° C./ <15 atm | LMA064 | portlandite + sodalite + brucite |
| Sep. 30, 2002/ 72 hrs | basalt + NaOH + $Na_2CO_3$ + $H_2O$ | 200° C./ <15 atm | LMA063 | brucite + AUCP |
| Oct. 14, 2002/ 72 hrs | prereacted basalt + NaOH + $Na_2CO_3$ + $H_2O$ | 200° C./ <15 atm | LMA059 | calcite + carbonate-cancrinite, pH: 12.5/≥14 |

[@]Sources of solid-silicate starting materials: wollastonite-Willsboro, NY; anorthite-Grass Valley, CA; labradorite-Nain, Labrador, Canada; basalt (USGS standard BCR-2)-Portland, OR; Ca-rich fly ash, Joseph City, AZ; $Ca(OH)_2$ (portlandite)-commercially manufactured, reagent-grade chemical compound; $Mg(OH)_2$ (brucite)-commercially manufactured, reagent-grade chemical compound. NaOH (caustic soda) was added to each unreacted starting sample as a 50 weight percent solution of NaOH in $H_2O$.
[#]For each solid silicate, "prereacted" means reaction with a 50 weight percent solution of NaOH in $H_2O$ at 200° C., P < 15 atm, before the experiment was performed. In all cases, this step had the effect of converting the silicates to crystalline hydroxide(s) prior to reaction with $Na_2CO_3$ to form one or more crystalline carbonate compounds.
[&]Chemical compositions of crystalline reaction products: calcite—$CaCO_3$; portlandite—$Ca(OH)_2$; hydroxy-sodalite—$Na_8(AlSiO_4)_6(OH)_2$; sodium-calcium hydroxysilicate—$NaCaSiO_3(OH)$; carbonate-cancrinite—$Na_8(AlSiO_4)_6CO_3·2H_2O$; brucite—$Mg(OH)_2$; pectolite—$NaCa_2Si_3O_8(OH)$; hydrogrossular—$Ca_3Al_2(SiO_4)_3·xH_2O$. AUCP = additional unidentified crystalline phase(s).

TABLE 2

Results of Experiments with Crystalline Magnesium Silicates

| Date/ Duration[@] | Starting Materials[@,#] | Temperature/ Pressure | XRD Number | Solid Run Products, and Initial/Final Solution pH[&] |
|---|---|---|---|---|
| Jun. 10, 2002/ 72 hrs | serpentine + NaOH + $H_2O$ | 200° C./ <15 atm | LMAS001-1 | brucite + relict serpentine |
| Jul. 1, 2002/ 72 hrs | olivine + NaOH + $H_2O$ | 200° C./ <15 atm | — | brucite |
| Jul. 16, 2002/ 72 hrs | prereacted olivine + $Na_2CO_3$ + $H_2O$ | 200° C./ <15 atm | LMAS006 | brucite |
| Sep. 20, 2002/ 24 hrs | serpentine + NaOH + $H_2O$ | 200° C./ <15 atm | LMA069 | brucite + trace AUCP |
| Sep. 23, 2002/ 72 hrs | serpentine + NaOH + $H_2O$ | 200° C./ <15 atm | LMA067 | brucite + trace AUCP |
| Sep. 25, 2002/ 72 hrs | $Mg(OH)_2$ + $Na_2CO_3$ + $H_2O$ | 200° C./ <15 atm | LMA072 | brucite, pH: 12.5/12.5 |

TABLE 2-continued

Results of Experiments with Crystalline Magnesium Silicates

| Date/ Duration@ | Starting Materials@,# | Temperature/ Pressure | XRD Number | Solid Run Products, and Initial/Final Solution pH& |
|---|---|---|---|---|
| Oct. 17, 2002/ 72 hrs | serpentine + NaOH + H$_2$O | 22° C./ 1 atm | LMA073 | serpentine + brucite |
| Oct. 18, 2002/ 72 hrs at 22° C., then 3 hrs at 200° C. | serpentine + NaOH + H$_2$O | 22° C./ 1 atm, 200° C./ <15 atm | LMA075 | brucite + minor relict serpentine |
| Nov. 15, 2002/ 72 hrs | Mg(OH)$_2$ + Na$_2$CO$_3$ + H$_2$O | 300° C./ <86 atm | LMA078 | brucite |
| Nov. 19, 2002/ ~1 hr | Mg(OH)$_2$ + Na$_2$CO$_3$ + H$_2$O | 375° C./ <220 atm | LMA079 | brucite |
| Dec. 23, 2002/ 72 hrs | Mg(OH)$_2$ + Na$_2$CO$_3$ + H$_2$O | 200° C./ ~60 atm* | LMA088 | eitelite + minor relict brucite |
| Dec. 30, 2002/ 72 hrs | Mg(OH)$_2$ + H$_2$O | 200° C./ ~60 atm* | LMA090 | magnesite + minor relict brucite, final pH: 5.5 |
| Jan. 17, 2003/ 72 hrs | Mg(OH)$_2$ + Na$_2$CO$_3$ + H$_2$O | 300° C./ ~60 atm* | LMAS014 | brucite + eitelite, pH: 11.5-12/ 12 |
| Mar. 17, 2003/ 72 hrs | Mg(OH)$_2$ + Na$_2$CO$_3$ + H$_2$O | 100° C./ <1 atm | LMAS017 | brucite + magnesium carbonate hydrate |
| Mar. 21, 2003/ 72 hrs | Mg(OH)$_2$ + Na$_2$CO$_3$ + H$_2$O | 80° C./ <1 atm | LMAS022 | brucite + magnesium carbonate hydrate, pH: 12.5/12.5 |
| Apr. 7, 2003/ 72 hrs | Mg(OH)$_2$ + Na$_2$CO$_3$ + H$_2$O | 125° C./ <2 atm | LMAS030 | brucite + magnesium carbonate hydrate, final pH: 11.5 |
| Apr. 16, 2003/ 72 hrs | Mg(OH)$_2$ + NaHCO$_3$ + H$_2$O | 200° C./ <15 atm | — | magnesite + minor eitelite + minor relict brucite |

@Sources of crystalline silicate starting materials: olivine-Twin Sisters Peak, WA; serpentine (antigorite variety)-Cedar Hill Quarry, Lancaster County, PA; Mg(OH)$_2$ (brucite)-commercially manufactured, reagent-grade chemical compound. NaOH (caustic soda) was added to each unreacted starting sample as a 50 weight percent solution of NaOH in H$_2$O.
For each solid silicate, "prereacted" means reaction with a 50 weight percent solution of NaOH in H$_2$O at 200° C., P < 15 atm, before the experiment was performed. In all cases, this step had the effect of converting olivine or serpentine to brucite prior to reaction with Na$_2$CO$_3$ or NaHCO$_3$ to form one or more crystalline carbonate compounds.
*A total (fluid) pressure of approximately 60 atm was achieved by injecting CO$_2$ into the headspace of the autoclave, and keeping that space connected to an external cylinder filled with liquid CO$_2$ at room temperature.
&Chemical compositions of crystalline reaction products: olivine—Mg$_2$SiO$_4$; serpentine—Mg$_3$Si$_2$O$_5$(OH)$_4$; brucite—Mg(OH)$_2$; eitelite—Na$_2$Mg(CO$_3$)$_2$. magnesium carbonate hydrate—MgCO$_3$•xH$_2$O. AUCP = additional unidentified crystalline phase(s).

In accordance with the provisions of the patent statutes, the principle and mode of operation of this invention have been explained and illustrated in its preferred embodiments. However, it must be understood that this invention may be practiced otherwise than as specifically explained without departing from its spirit or scope.

What is claimed:

1. A process of sequestering carbon dioxide, the method comprising:
    (a) reacting serpentine rock with a first caustic alkali metal hydroxide to produce magnesium hydroxide, wherein the serpentine rock is not thermally pretreated before reaction with the first caustic alkali metal hydroxide;
    (b) reacting carbon dioxide with at least one of a second caustic alkali metal hydroxide and an alkali metal silicate to produce at least one of an alkali metal carbonate and an alkali metal bicarbonate; and
    (c) reacting the magnesium hydroxide product of step (a) with at least one of the alkali metal carbonate and the alkali metal bicarbonate produced in step (b) to produce a magnesium carbonate.

2. The process of claim 1, wherein the reaction of step (c) further produces a reconstituted caustic alkali metal hydroxide, and wherein the process further comprises an additional step (d) of recycling the reconstituted caustic alkali metal hydroxide from step (c) into the reaction of step (a).

3. The process of claim 1, wherein steps (b) and (c) are conducted at a pressure not greater than about 50 bars above the vapor pressure of pure water.

4. The process of claim 1, wherein steps (b) and (c) are conducted at a pressure not greater than about 30 bars above the vapor pressure of pure water.

5. The process of claim 1, wherein steps (b) and (c) are conducted at a pressure not greater than about 20 bars above the vapor pressure of pure water.

6. The process of claim 1, wherein steps (b) and (c) are conducted at a pressure not greater than about 10 bars above the vapor pressure of pure water.

7. The process of claim 1, wherein the magnesium carbonate is magnesite or eitelite.

8. The process of claim 1, wherein the second caustic alkali metal hydroxide is selected from the group consisting of sodium hydroxide, potassium hydroxide, lithium hydroxide, and mixtures thereof.

9. The process of claim 1, further comprising reducing the particle size of the metal silicate to an average diameter of less than about two millimeters.

10. The process of claim 1, wherein the source of carbon dioxide is an industrial waste source of carbon dioxide.

* * * * *